Dec. 26, 1939.  W. J. MORRILL ET AL  2,185,130
APPARATUS FOR STARTING ELECTRIC MOTORS
Filed Dec. 21, 1937
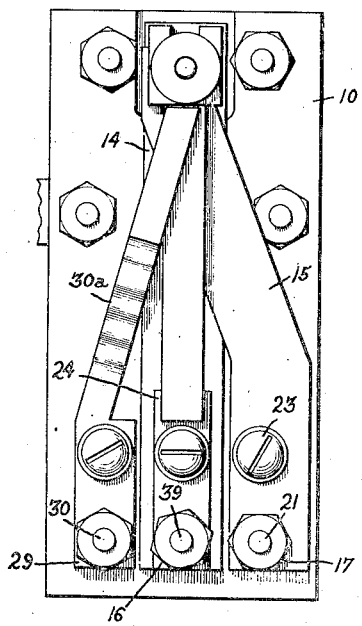
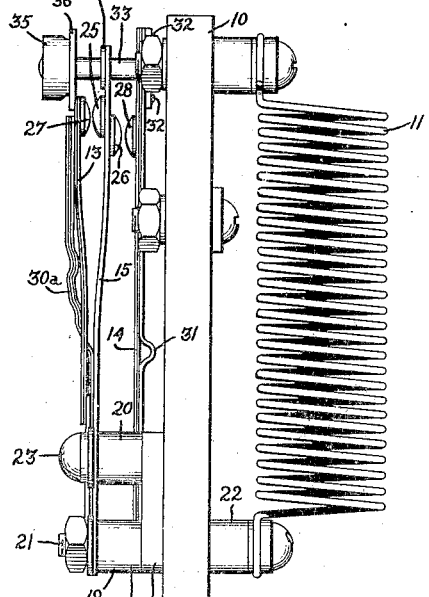
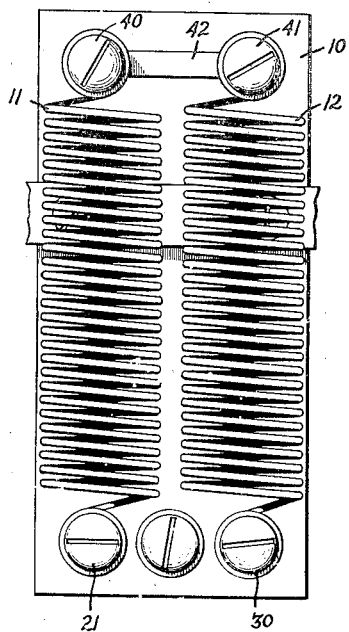
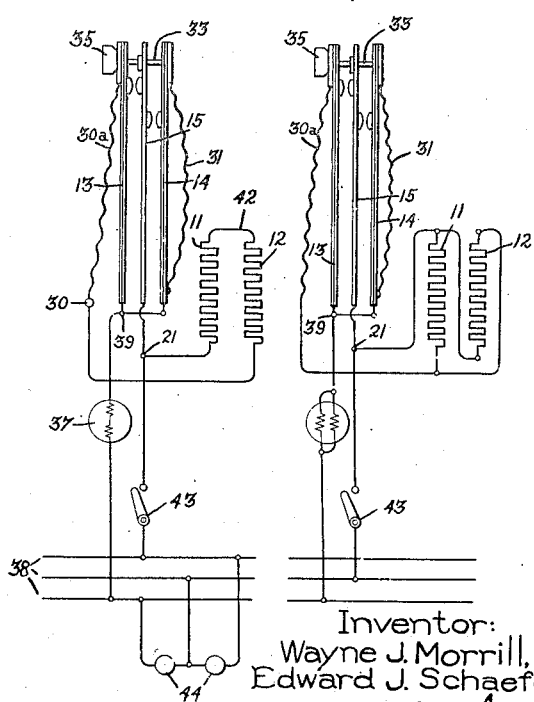
Inventor:
Wayne J. Morrill,
Edward J. Schaefer,
by Harry E. Dunham
Their Attorney.

Patented Dec. 26, 1939

2,185,130

UNITED STATES PATENT OFFICE 2,185,130

APPARATUS FOR STARTING ELECTRIC MOTORS

Wayne J. Morrill and Edward J. Schaefer, Fort Wayne, Ind., assignors to General Electric Company, a corporation of New York Application December 21, 1937, Serial No. 181,016

11 Claims. (Cl. 172—289)

This invention relates to the starting of electric motors, particularly small electric motors such as may be started by connection directly to a supply circuit, and has for its object apparatus for starting electric motors in such manner as to prevent detrimental flicker of electric lamps connected to the same electric supply circuit as the motor.

It is customary in the starting of certain types of small electric motors, especially alternating current capacity and split-phase motors, to connect the motor directly to the electric supply source without external starting resistance. This method of starting results in starting currents several times greater than the full load running current of the motor.

This method of starting has the disadvantage of causing momentary dimming or flicker of electric lamps connected to the motor supply circuit either directly to the motor circuit or through a supply transformer. In fact, small electric motors are most often constructed for a 110 or 220 volt supply source so that they may be connected directly to an electric lamp circuit. This flicker of the lamps is caused by a voltage drop in the lighting circuit, hence lower current in the lamps, resulting from the relative high current taken by the motor. As the motor accelerates, its current decreases and the lamps resume their original or approximately original brightness.

No very objectionable light flicker is ordinarily occasioned by the operation of small household utility motors nor, in fact, by motors up to perhaps one H. P. in size. However, with motors of one H. P. and larger size, the flicker of the lamps caused by connection of the motor directly to the supply circuit in starting is a source of considerable annoyance to persons desiring to utilize the lamps.

In carrying out our invention, we connect the motor to the lamp circuit in steps by means of external resistance, each step producing a decrease in the illumination of the lamps too small to be objectionable. We have found that two steps are ordinarily sufficient for motors of from one to three H. P. In one form of our invention, we provide a resistance which is included in series with the motor when the motor is first connected to the supply circuit together with timing means responsive to the motor current, which means may be a bimetallic thermostat, for short-circuiting this resistance after a predetermined time interval, preferably one-half to one second, of sufficient duration for the eye to adjust itself to the decrease in the brightness of the lamps.

For a more complete understanding of our invention, reference should be had to the accompanying drawing, Fig. 1 of which is a plan view of apparatus for starting electric motors embodying out invention; Fig. 2 is a side view of the device shown in Fig. 1; Fig. 3 is a rear view of the device shown in Fig. 1; Fig. 4 is a typical diagram of the electrical connections for a 220 volt motor including the device of Figs. 1, 2 and 3, while Fig. 5 is a view similar to Fig. 4 but showing the connections for a 110 volt motor.

Referring to the drawing, in carrying out our invention in one form, we provide a unitary device consisting of a base member 10 preferably made of electrically insulated material, such as a molded phenolic condensation product, on one side of which is mounted a current limiting resistance, shown as two coils 11 and 12, while on the other side of the base 10 is mounted current responsive timing means for short-circuiting the resistance a predetermined time interval after the energization of the motor. This timing means comprises two bimetallic thermostatic strips 13 and 14 with an intermediate spring arm or strip 15. These three strips are each mounted at one end on the base 10 while their other ends are in suitably spaced relation, one above the other, as seen in Fig. 1. As shown, the two bimetallic strips 13 and 14 are mounted on a suitable support 16 while the spring member 15 is mounted on a similar support 17.

Referring to Fig. 2, the support 17 comprises a rectangular block 18 made of an electrically conducting material such as brass and two electrically insulating tubular supports 19 and 20. A bolt 21 extends through the insulator 19 and apertures in the block 18 and the base 10, and through another spacing insulator 22, its head securing one end of the resistor 11 between two washers, as shown in Fig. 2. The spring arm 15 is mounted on the ends of the spacing insulators 19 and 20, the bolt 21 passing through its end and clamping it on the insulator 19 while the screw 23, cooperating with the base 10, clamps it onto the insulator 20. From the support 17, the spring member is bent downward or toward the right hand, as seen in Fig. 2, and it extends at an angle toward the left hand as seen in Fig. 1 so as to bring its free end between ends of the two thermostats 13 and 14.

The support 16 is similar in construction to the support 17. It is provided with spacing insulators similar to the insulators 19 and 20 but preferably somewhat longer so that the thermostat 13 is spaced somewhat farther from the base 10 than the spring 15, as indicated in Fig. 2. Preferably the thermostat 13 is suitably secured, as by welding, to a rectangular current conducting member 24 which is considerably larger than the thermostat, this being secured in turn to the support 16.

As indicated in Fig. 1, the thermostat 14 is much wider than the thermostat 13, in fact about twice as wide to give it increased rigidity. This thermostat is secured by clamping it between the insulators of the support 16 and its conducting block similar to block 18. The two thermostats are in parallel spaced relation while the spring 15, as seen in Fig. 1, extends from the support 17 at an angle with the thermostats. The spring 15 has on its free end two electrical switch contacts 25 and 26 on opposite sides which cooperate respectively with contacts 27 and 28 on the ends of the thermostats 13 and 14.

A third support 29 is provided on the base similar in construction to the other two supports. This support, however, serves solely as a terminal, its bolt 30 providing a ready means for connection to an electrical circuit. From this terminal support 29, a flexible conductor 30a, which may be laminated copper, extends to the outer free end of the thermostat 13 to which it is suitably connected as by brazing or welding. A similar flexible conductor 31 extends in engagement with the thermostat 14 throughout its entire length, it being secured to the thermostat at one end by the support 16 and at its outer end by suitable rivets 32. It will be observed that the flexible conductor 30a provides for the connection of the thermostat 13 in a circuit while the conductor 31 completely short circuits the thermostat 14 so that it is impossible for the thermostat 14 to carry sufficient current to be appreciably heated thereby.

In the operation of the device the thermostat 14 is influenced only by the temperature of the ambient air, its function being to assure operation of the device after a predetermined time interval regardless of the ambient temperature. This the thermostat 14 does by means of a mechanical cross connection, shown as a rod 33, secured to its end and extending transversely thereof. It is provided with a circular shoulder 34 just to the left hand of the strip 15, as seen in Fig. 2, and against which the end of the strip 15 presses by reason of the resiliency of the strip 15. Preferably the end of the strip 15 is forked to embrace the rod 33. Thus changes in the ambient temperature cause movement of the free end of the thermostat 14 which carries with it the end of the spring 15. Ambient temperature changes correspondingly affect the thermostat 13, the two thermostats being arranged to operate in unison upon a given change in ambient temperature. As a result, the spacing between the two pairs of contacts 25, 27 and 26, 28 is unaffected by changes in ambient temperature.

In order to provide for snap action of the thermostat 13, we have mounted a small permanent magnet 35 on the rod 33. An armature member 36 is provided on the end of the thermostat 13, this armature being forked to embrace the rod 33, and at normal temperatures lying in attracted position against the face of the magnet 35, as seen in Fig. 2.

This magnet 35 is made of permanent magnet material having a high coercive force, preferably an alloy consisting of 12% aluminum, 25% nickel, and 5% copper the balance being iron, such as described and claimed in Patent 1,947,274, issued February 13, 1934 to William E. Ruder, and Patent 2,027,997, issued January 14, 1936, to Tokushichi Mishima.

As shown in Fig. 4, for a 220 volt motor, the two resistances 11 and 12 are connected in series with each other. One terminal of the electric motor 37 is connected directly to one side of the 3-wire 110–220 volt supply source 38 while the other terminal of the motor is connected to the bolt 39 of the support 16 which forms a terminal. The connections of the resistance sections are as indicated in Figs. 1–3 inclusive, the lower end of the sections being connected respectively to the terminal bolts 21 and 30 while their upper ends, supported on bolts or screws 40 and 41, are electrically connected by a conductor 42. Connection is made from the other side of the supply source through a suitable switch 43 to the terminal bolt 21.

When the switch 43 is closed to start the motor, current flows (Fig. 4) from the lower supply line through the motor to the terminal 39, thence through the thermostat 13, the flexible conductor 30a to the terminal 30, thence through the resistances 12 and 11 to the terminal 21 and the switch 43 to the other side of the source. Preferably under these conditions, the resistances 11 and 12 are great enough to prevent the necessary flow of starting current to start the motor if it is connected to drive its normal load. The decrease in the voltage of the lighting circuit occasioned by this initial current, which for a one H. P. motor may be on the order of 25 amperes, is not great enough, however, to produce an objectionable flicker of the lights 44 connected to the circuit. For a one H. P., 220 volt, capacity type motor, we have found that a resistance of about seven ohms is suitable.

The value of the resistance will vary with the type of motor or more particularly with the electrical impedance of the motor. In other words, for a definite lighting circuit voltage, say 220 volts, approximately twenty-five amperes can be allowed to flow through the motor circuit without causing objectionable flicker of the lamps. This permissible current value, of course, is also dependent upon the ohmic resistance of the lighting circuit, but we have found it to be a fair average value.

Continuing with the starting operation, the current in the circuit heats the thermostat 13 and after a predetermined time interval, such as ½ second or less, during which the eye becomes adjusted to the decreased brightness of the lamps, the thermostat is distorted sufficiently to pull away from the magnet 35 and snap into engagement with the contact 25. This closes the circuit from the terminal 21 through the flexible strip 15, the contacts 25, 27 and the thermostat 13 to the terminal 39, thus completely short circuiting the resistance and connecting the motor directly across the supply lines. The motor now starts and accelerates to full speed.

When the resistance is short circuited by the thermostat, a second sudden increase in current occurs to the full starting current value of the motor, for example, to about 36 amperes for a one H. P., 220 volt motor. However, this increase in current also is not great enough to cause an objectionable flicker in the lights. In other words, the resulting decrease in the intensity of illumination occasioned by the drop in voltage of the light circuit is not objectionable. As the motor accelerates to full speed and takes less and less current from the line, the voltage of the lighting circuit increases and the brightness of the lamps increases to the normal value. This change takes place so slowly as to be hardly perceptible, ordinarily in a time about the same as the time of the first step, i. e., up to ½ second. The running current for the motor previously assumed will be from five to nine amperes depending upon the load.

Fig. 5 shows the connections for a 110 volt motor. In this case the two resistances 11 and 12 are connected in parallel with each other, the connections otherwise being the same as those shown in Fig. 4.

We have also provided a protective feature to prevent burning out of the thermostat 13 in the event that the motor fails to start or for any reason takes an excessively high current. It will be observed that the current in the motor, after the resistance is short circuited, still passes through the thermostat 13. Under normal load operating conditions, the thermostat, after the motor reaches full speed, is heated sufficiently by the motor current to maintain the contact 27 in engagement with the contact 25. In case the motor fails to start, for example, because of a defect in the device it is driving whereby a load is imposed on the motor which is too great for the motor to start, the continued starting current in the motor circuit heats the thermostat 13 very rapidly and if continued, would eventually overheat and destroy the thermostat. With the arrangement disclosed, however, the thermostat upon continued high current moves still farther toward the right hand as viewed in Fig. 2 and carries with it the end of the spring 15 whereby the contact 26 is brought into engagement with the contact 28. This, it will be observed, short circuits the thermostat 13, the circuit leading from the terminal 39 through the conductor 31, contacts 26, 28 and the conductor 15 to the terminal 21. In the event that the excessive current is continued and the thermostat cools so that the contact 26 is disengaged from the contact 26, the thermostat is reconnected thereby in the circuit and again heated to short circuit itself.

It will be understood that the lamp flicker can be prevented by changing the internal connections of the motor windings in such manner as to limit the initial current to a low value giving no perceptible flicker, for example, by temporarily disconnecting one of a plurality of parallel connected windings or by changing the connections from parallel to series, the normal connections being made after a predetermined interval.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A motor starting device comprising a current limiting resistance of such value as to limit the current in the motor circuit to a value less than required for starting of the motor under normal load conditions, a switch for short-circuiting said resistance, a bimetallic thermostatic strip for operating said switch, connections for heating said thermostatic strip in accordance with the current in the motor circuit whereby said strip operates said switch after a predetermined time interval, said strip being arranged to be heated by the normal motor current to hold said switch closed, and a second switch operated by said strip in response to a predetermined high motor current to short-circuit said strip.

2. A motor starting device comprising a resistance of such value as to limit the current in the motor circuit to a value less than required for starting of the motor under normal load conditions, a switch for short-circuiting said resistance, a bimetallic thermostatic strip for operating said switch, said thermostat normally holding said switch open, connections for passing the motor current through said strip whereby said strip is heated to close said switch a predetermined time interval after the motor is energized, said strip being arranged to be heated by the normal motor current to hold said switch closed, and a second switch operated by said strip to short-circuit said strip in response to a predetermined high current.

3. A starting device for an electric motor comprising a current limiting resistance for connection in the circuit of a motor, said resistance being of such value as to limit the current in the motor circuit to a value less than required for starting of the motor under normal load conditions, a bimetallic thermostatic strip supported at one end and having its other end free, a spring arm having its free end adjacent the end of said thermostatic strip, a switch contact on each side of said spring arm, a contact on said thermostatic strip in position to engage one of said contacts on said spring arm, connections for connecting said thermostatic strip in series with said resistance, whereby said strip is heated by the current in the motor circuit and after a predetermined time interval moves its contact into engagement with the cooperating contact on said spring arm, connections whereby engagement of said contacts short-circuits said resistance for acceleration of said motor, a second contact arranged to be engaged by the other contact on said spring arm, said strip being responsive to a continued excessive current to move said spring arm to bring its other contact into engagement with said second contact, and connections whereby engagement of said last mentioned contacts short-circuits said thermostatic strip.

4. A motor starting device comprising a current limiting impedance arranged for connection in the circuit of a motor, said impedance being of such value as to limit the current in the motor circuit to a value less than required for starting of the motor under normal load conditions, switching means for excluding said impedance from the motor circuit, and timing means for operating said switching means to exclude said impedance from the motor circuit thereby to provide for full motor starting current and starting of the motor under normal load conditions.

5. A motor starting device comprising a current limiting impedance arranged for connection in the circuit of a motor, said impedance being of such value as to limit the current in the motor circuit to a value less than required for starting of the motor under normal load conditions, switching means for excluding said impedance from the motor circuit, and timing means responsive to the current in said impedance for operating said switching means to exclude said impedance from the motor circuit after a predetermined time interval thereby to provide for full motor starting current and starting of the motor under normal load conditions.

6. A motor starting device comprising a current limiting impedance arranged for connection in the circuit of a motor, said impedance being of such value as to limit the current in the motor circuit to a value less than required for starting of the motor under normal load conditions, switching means for excluding said impedance from the motor circuit, and timing means responsive to the current in the motor circuit for operating said switching means to exclude said impedance from the motor circuit after a predetermined time interval to provide for full motor starting current and starting of the motor under normal load conditions, said timing means being responsive to normal running motor current to maintain said switching means in position to exclude said impedance.

7. A motor starting device comprising a current limiting impedance arranged for connection in the circuit of a motor, said impedance being of such value as to limit the current in the circuit of the motor to a value less than required for starting of the motor under normal load conditions, switching means operable to exclude said impedance from the circuit of said motor, a thermostatic means for operating said switching means, and connections for heating said thermostatic device in accordance with the current in said impedance to cause said thermostatic means to operate said switching means and exclude said impedance after a predetermined time interval thereby to provide for full motor starting current and starting of the motor under normal load conditions.

8. A motor starting device comprising a current limiting impedance arranged for connection in the circuit of a motor, said impedance being of such value as to limit the current in the circuit of the motor to a value less than required for starting of the motor under normal load conditions, a normally open switch connected to short circuit said impedance, a thermostat for operating said switch to the closed position, and connections for heating said thermostat in accordance with the current in said impedance to cause said thermostat to close said switch after a predetermined time interval thereby to provide for full motor starting current and starting of the motor under normal load conditions, said thermostat being arranged to maintain said switch closed in response to the normal running motor current.

9. A motor starting device comprising a current limiting resistance for connection in the circuit of a motor, a motor current thermostat, connections for heating said motor current thermostat in accordance with the motor current, an ambient temperature thermostat, means supporting said thermostats for movement in unison in response to the same temperature change, movable contact means, a first contact movable by said ambient thermostat arranged to be engaged by said contact means when said contact means is moved toward said ambient thermostat, a stop member carried by said ambient thermostat for limiting the movement of said contact means away from said ambient thermostat, said contact means normally engaging said stop, a second contact carried by said motor current thermostat arranged to engage said contact means upon distortion of said motor current thermostat in response to an increase in temperature, snap operating means between said stop member and said motor current thermostat, connecting means for connecting said resistance in a motor circuit in series with said motor current thermostat and for connecting said contact means to said motor to provide for the short circuiting of said resistance upon engagement of said second contact with said contact means upon distortion of said motor current thermostat, and connections for connecting said first contact to said motor for the short circuiting of both said resistance and said motor current thermostat upon continued distortion of said motor current thermostat to bring said contact means into engagement with said first contact.

10. A motor starting device comprising a current limiting resistance for connection in the circuit of a motor, a motor current thermostat, connections for heating said motor current thermostat in accordance with the motor current, an ambient temperature thermostat, means supporting said thermostats for movement in unison in response to the same temperature change, an arm, contact means on said arm, a first contact movable by said ambient thermostat arranged to be engaged by said contact means when said arm is moved toward said ambient thermostat, a stop member carried by said ambient thermostat for limiting the movement of said arm away from said ambient thermostat, means biasing said arm into engagement with said stop, a second contact movable by said said motor current thermostat arranged to engage said contact means upon distortion of said motor current thermostat in response to an increase in temperature, and connecting means for connecting said resistance in a motor circuit in series with said motor current thermostat and for connecting said arm to the motor to provide for the short circuiting of said resistance through said arm upon engagement of said second contact with said contact means upon distortion of said motor current thermostat, and connections for connecting said first contact to the motor for the short circuiting of both said resistance and said motor current thermostat through said arm upon continued distortion of said motor current thermostat to bring said contact means into engagement with said first contact.

11. A motor starting device comprising a current limiting resistance for connection in the circuit of a motor, said resistance being of such value as to limit the current in the motor circuit to a value less than required for the starting of the motor under normal load, a motor current bimetallic thermostat, connections for heating said motor current thermostat in accordance with the motor current, an ambient temperature bimetallic thermostat, means supporting one end of each of said thermostats so that the other ends of said thermostats move in unison in response to the same temperature change, a flexible arm, contact means carried on said arm, a first contact on said ambient thermostat arranged to be engaged by said contact means when said arm is flexed toward said ambient thermostat, a stop member carried by said ambient thermostat for limiting the movement of said arm away from said ambient thermostat, said arm normally engaging said stop, a second contact carried by said motor current thermostat arranged to engage said contact means upon distortion of said motor current thermostat in response to an increase in temperature, an armature carried by said motor current thermostat, a magnet carried by said stop member normally engaging said armature and providing for snap movement of said motor current thermostat to bring said second contact into engagement with said contact means, and connecting means for connecting said resistance in a motor circuit in series with said motor current thermostat and for connecting said arm to the motor to provide for the short circuiting of said resistor through said arm upon engagement of said second contact with said contact means upon distortion of said motor current thermostat, and connections for connecting said first contact to the motor for the short circuiting of said resistance and said motor current thermostat through said arm upon continued distortion of said motor current thermostat to bring said contact means into engagement with said first contact.

WAYNE J. MORRILL.
EDWARD J. SCHAEFER.